United States Patent Office 2,751,417
Patented June 19, 1956

2,751,417

OXIDATION OF SATURATED CYCLIC HYDROCARBONS TO HYDROPEROXIDES

Herman I. Enos, Jr., Wilmington, Del., assignor to Hercules Powder Company, Wilmington, Del., a corporation of Delaware No Drawing. Application July 10, 1953,
Serial No. 367,366

10 Claims. (Cl. 260—610)

This invention relates to improvements in the oxidation of organic compounds by elementary oxygen and more particularly to such oxidation processes at lead to the production of hydroperoxides.

In the oxidation of organic compounds with elementary oxygen for the production of hydroperoxides, there is ordinarily an induction period during which time the rate of oxidation proceeds very slowly. However, the greatest difficulty, particularly in the case of saturated cyclic hydrocarbons, is in establishing a commercially rapid rate of oxidation to the hydroperoxide stage.

Now in accordance with the present invention, it has been found that a great improvement in the rate of oxidation of saturated cyclic hydrocarbons to hydroperoxides is accomplished by contacting a saturated cyclic hydrocarbon with elementary oxygen in the presence of 1 to 100 times the minimum effective amount of a finely divided noble metal catalyst.

The improved process of this invention is generally carried out by dispersing a finely divided noble metal such as palladium or platinum in the saturated cyclic hydrocarbon and passing a finely dispersed stream of air or oxygen through the reaction mixture at a temperature in the range of about 40° to about 125° C. until the hydroperoxide content of the mixture reaches the desired amount. The catalyst is then filtered out and the hydroperoxide is recovered from the reaction mixture or the reaction mixture is used directly for further reactions. To aid in the oxidation, an alkali such as ammonia, sodium hydroxide, sodium carbonate, sodium bicarbonate or lime is brought into contact with the reaction mixture during the oxidation process.

Specific illustrations of the process of this invention are set forth in the following examples. All parts and percentages, unless stated otherwise, are on a weight basis.

Examples 1–3

A mixture of 225 parts p-menthane, containing 3.0 parts p-menthane hydroperoxide as an initiator and 45 parts water containing 0.9 part sodium carbonate, was stirred vigorously at 115° C. while a fine stream of oxygen was introduced into the reaction mixture. The rate of hydroperoxide formation was followed for about 20 hours to find the initial rate and then a finely divided noble metal catalyst was added and the rate of hydroperoxide formation was again followed to find the rate in the presence of the catalyst. In the following table are set forth data on several runs using various noble metal catalysts. The rate of hydroperoxide formation is expressed in per cent increase in hydroperoxide content of the reaction mixture per hour.

| Example | 1 | 2 | 3 |
|---|---|---|---|
| Initial Rate of Hydroperoxide Formation (percent/hour) | 2.6 | 2.6 | 2.6 |
| Catalyst | Pd | Pt | Pd |
| Parts Catalyst per Million of p-Menthane | 10 | 10 | 15 |
| Hydroperoxide Content (percent) at Time of Adding Catalyst | 9.8 | 9.8 | 13.3 |
| Catalyzed Rate of Hydroperoxide Formation (percent/hour) | 3.7 | 3.6 | 5.1 |
| Hydroperoxide Content (percent) at End of Run | 26 | 25 | 23.4 |

Example 4

A mixture of 300 parts isopropylcyclohexane, 12 parts isopropylcyclohexane hydroperoxide, 60 parts water containing dissolved therein 6 parts sodium carbonate and 0.0675 part palladium on carbon per million parts isopropylcyclohexane was heated to 90° C. with rapid agitation and a fine stream of oxygen was passed into the reaction mixture for 15 hours. The isopropylcyclohexane hydroperoxide content increased from 4% to 9.9% in this length of time, showing an average rate of increase in hydroperoxide content of 0.39% per hour. In a blank run without the palladium, 30 hours were required to attain a hydroperoxide content of 10%.

Example 5

A mixture of 225 parts 1,4-dimethylcyclohexane and 1.7 parts 1,4-dimethylcyclohexane hydroperoxide was stirred vigorously with 50 parts water containing 0.11 part sodium carbonate dissolved therein, and 0.0625 part 5% palladium on carbon was added. This rapidly stirred mixture was heated to 90° C. and oxygen was introduced under 80 p. s. i. g. pressure. The rate of hydroperoxide formation over 14.2 hours was 1.0% per hour. In a blank run, in which the palladium catalyst was left out, the rate of oxidation was 0.42% hydroperoxide per hour.

Comparative tests with and without platinum and palladium catalysts in the oxidation of pinane, p-menthane, diisopropylcyclohexanes, hydrogenated terpene dimers, bicyclohexyl, decalin, and phenylcyclohexane show that there is a substantial increase in the rate of hydroperoxide formation when these noble metal catalysts are used in the oxidation process in accordance with the process of this invention.

The improvement in rate of oxidation is shown with all of the noble metal catalysts—palladium, platinum, osmium, iridium, ruthenium, and rhodium. The noble metal catalyst must be used in finely divided form and must be catalytically active. If the catalyst is catalytically active toward hydrogenation reactions, it is catalytically active in the process of this invention. By "finely divided" is meant that it is sufficiently finely divided as to have high enough surface to be classed as a catalyst. The finely divided catalyst may be attached to a support such as a noble metal, carbon, alumina, etc., and the amount of catalyst does not include the amount of any such support. The catalyst is also useful in colloidal form. The amount of noble metal catalyst is critical in that an excess causes increased by-product formation. In general, the catalyst concentration range is from about 0.01 to about 1000 parts per million of the hydrocarbon being oxidized, depending on the activity of the catalyst. The lower end of the range generally is used for the most finely divided or most active catalyst and the upper end of the range is generally used for the less finely divided catalyst or less active catalyst. The amount of catalyst to use is not more than 100 times the minimum effective amount. Thus, the range is essentially from a minimum effective amount to about 100 times the minimum effective amount, the minimum effective amount being defined as that amount which increases the rate of hydroperoxide formation by 10%. The minimum effective amount must be determined for each batch of catalyst used, since it varies with method of preparation and particle size of the catalyst.

The oxidation process of this invention is carried out at any temperature in the range of about 40° C. to about 125° C. The optimum range is about 80–125° C. and the preferred range is 85–120° C.

The process is carried out either in the absence of water or in the presence of water, and it may be carried out in aqueous emulsion of the oil-in-water or the waterin-oil type, if desired. Emulsifying agents such as soaps of fatty or resin acids, alkyl and alkaryl sulfates and sulfonates, and other ionic and nonionic emulsifiers may be used when the process is carried out in emulsified systems.

The oxidation may be carried out in the presence of an alkaline stabilizing agent. Alkalies may be added to the reaction mixture or the reaction mixture may be continuously circulated into a vessel containing alkali. Alkalies which are suitable for this purpose are ammonia; sodium and potassium compounds such as their hydroxides, carbonates, or bicarbonates, and alkaline-acting salts such as the acetate, stearate and resinate; lime; magnesia; and calcium carbonate. The alkali metal compounds are best used in aqueous systems and the calcium and magnesium compounds are best in nonaqueous systems. Preferably, the amount of alkaline stabilizing agent will be such that the reaction is carried out under substantially neutral conditions. In an aqueous system a pH range of 7 to 5 is preferred.

The hydrocarbons to which the improvement in the present invention is applicable are naphthene hydrocarbons in which there is a tertiary carbon atom. The hydroperoxides which are produced have the formula ROOH where R is a naphthene ring containing 4–8 carbon atoms in the ring with or without one or more organic substituents attached to the ring or where R is a saturated condensed ring grouping with or without one or more organic substituents attached to the condensed ring nucleus. The organic substituents may be alkyl, cycloalkyl, aralkyl, or aryl radicals or combinations of these radicals. Thus, the naphthene ring may be monocyclic, bicyclic, or polycyclic. Examples of naphthene hydrocarbons having tertiary carbon atoms which are oxidized in accordance with this invention include alkyl cyclopentane, alkyl cyclohexane, alkyl cycloheptane, and alkyl cyclooctane where the alkly group may be methyl, ethyl, propyl, isopropyl, butyl, isobutyl and t-butyl. Further examples of monocyclic naphthenes having tertiary carbon atoms are dimethylcyclopentanes, ethylcyclopentanes, diethylcyclopentanes, trimethylcyclopentanes, and the corresponding substituted cyclohexanes and cycloheptanes. In this group are also included o-, m-, and p-menthanes. Naphthene hydrocarbons having a tertiary carbon atom in which there is an aryl substituent include phenylcyclopentane, phenylcyclohexane, phenylcycloheptane, and phenylcyclooctane. Also included are corresponding analogs in which the aryl group is naphthyl, biphenyl, anthryl, phenanthryl, and the like. Bicyclic naphthene hydrocarbons having a tertiary carbon atom and included within the scope of the present invention are pinane, camphane, bornylane, decalin, decahydroanthrancene, and tetrahydrofluorene. Also included within the scope of the invention are tetradecahydrophenanthrene, decahydroacenaphthene, hexahydroindane, and the various substituted condensed ring naphthenes in which the substituent groups may be alkyl, aralkyl, cycloalkyl, aryl or combinations of two or more of these groups. The oxidation reaction of the present invention produces hydroperoxides of these naphthene hydrocarbons chiefly in the tertiary carbon. However, in some instances the hydroperoxide may be at positions other than the tertiary carbon atom and in these instances the oxidation is promoted by the presence of a tertiary carbon in the molecule. The naphthene hydrocarbons oxidized in the process of the present invention may be either pure hydrocarbons or mixtures of hydrocarbons.

The oxygen used in the oxidation process is elementary oxygen. Molecular oxygen such as pure oxygen gas or oxygen diluted with inert gases such as air may be used. Oxygen diluted with other gases including steam, or other inert gases, may also be used.

There are many advantages in the process of this invention other than those due to the increased rate of oxidation. For example, in the oxidation of p-menthane use of the noble metal catalysts of this invention results in the final product containing the tertiary hydroperoxide as the major hydroperoxide component. A further advantage of the noble metal catalysts is their ease of removal. They may be removed by filtration, a filter aid being used if desired and further treatment of the oxidate is unnecessary before distillation or any other desired subsequent treatment.

What I claim and desire to protect by Letters Patent is:

1. The process of preparing a tertiary hydroperoxide which comprises passing elementary oxygen through a saturated naphthene hydrocarbon having a tertiary carbon atom in liquid phase at a temperature between about 40° C. and about 125° C. in the presence of a finely divided metal catalyst of atomic number in the range of 44–78 and classified in group VIII of the periodic table, the concentration of the finely divided metal catalyst in the oxidation reaction mixture being from 1 to 100 times the amount necessary to increase the rate of hydroperoxide production by 10% based on the naphthene hydrocarbon.

2. The process of claim 1 in which the metal is platinum.

3. The process of claim 1 in which the metal is palladium.

4. The process of claim 1 in which the naphthene hydrocarbon is phenylcyclohexane.

5. The process of claim 1 in which the naphthene hydrocarbon is isopropylcyclohexane.

6. The process of claim 1 in which the naphthene hydrocarbon is p-menthane.

7. The process of claim 1 in which the naphthene hydrocarbon is decalin.

8. The process of claim 1 in which the naphthene hydrocarbon is bicyclohexyl.

9. The process of preparing a tertiary hydroperoxide which comprises passing elementary oxygen through a saturated naphthene hydrocarbon having a tertiary carbon atom in an aqueous emulsion at a temperature between about 40° C. and about 125° C. in the presence of a finely divided metal catalyst of atomic number in the range of 44–78 and classified in group VIII of the periodic table, the concentration of the finely divided metal catalyst in the oxidation reaction mixture being from 1 to 100 times the amount necessary to increase the rate of hydroperoxide production by 10% based on the naphthene hydrocarbon.

10. The process of preparing a tertiary hydroperoxide which comprises passing elementary oxygen through a saturated naphthene hydrocarbon having a tertiary carbon atom in liquid phase at a temperature between about 80° C. and 125° C. in the presence of a finely divided metal catalyst of atomic number in the range of 44–78 and classified in group VIII of the periodic table, the concentration of the finely divided metal catalyst in the oxidation reaction mixture being from about 1 to 100 times the amount necessary to increase the rate of hydroperoxide production by 10% based on the naphthene hydrocarbon.

References Cited in the file of this patent

UNITED STATES PATENTS

| | | |
|---|---|---|
| 2,475,155 | Rosenblatt | July 5, 1949 |
| 2,618,662 | Hutchison | Nov. 18, 1952 |
| 2,664,448 | Lorand et al. | Dec. 29, 1953 |

OTHER REFERENCES

Kreulin: Jour. Institute Petroleum, vol. 38 (1952), pp. 445–448.